T. W. WHITE.
Cotton Planter.
No. { 1,094,
32,098. }
Patented Apr. 16, 1861.
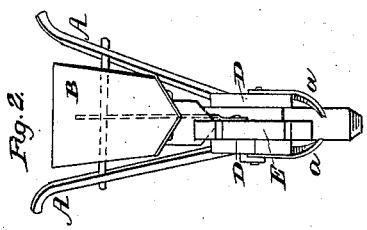
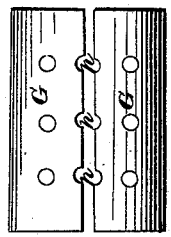
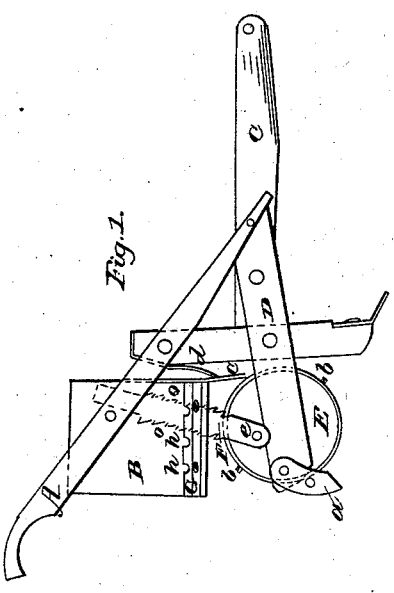
Witnesses:
Inventor:

UNITED STATES PATENT OFFICE.

THOMAS W. WHITE, OF MILLEDGEVILLE, GEORGIA.

IMPROVEMENT IN SEED-PLANTERS.

Specification forming part of Letters Patent No. 32,098, dated April 16, 1861.

*To all whom it may concern:*

Be it known that I, T. W. WHITE, of Milledgeville, Baldwin county, State of Georgia, have invented certain new and useful Improvements in Machines for Planting Cotton and other Seeds, of which the following is a full, clear, and exact description, reference being had to the accompanying drawings, forming part of this specification, in which—

Figure 1 represents a side elevation of a seed-planter embracing my improvements. Fig. 2 represents a rear elevation of the same. Fig. 3 represents a plan of the under side of the seed-hopper.

It is well known that the great difficulty in sowing cotton-seed uniformly by automatic means arises from the fibrous character of the seed, which causes it to cohere and mat in the seed-box, and prevents it from being discharged freely and uniformly. This same difficulty is also experienced with other seeds when mingled with guano or other fertilizers, which cause the seed to pack and adhere together in the seed-box and prevent its escaping freely and regularly, especially in damp or wet weather.

The object of my invention is the construction of a cheap, light, and simple machine adapted to planting cotton-seed or sowing guano or other fertilizers with the seed, and preventing the seed packing in the seed-box, and causing it to be discharged regularly and uniformly in the drill.

My invention for effecting these objects consists, first, in drawing the seed out at regular intervals through the opening in the bottom of the hopper by means of a reciprocating serrated blade passing through the bottom of the hopper; second, in leaving the upper end of the blade free so that it may swing back and forward in the hopper against the seed so as to act upon the seed in all parts of the hopper; third, giving reciprocating motion to the blade by means of the guiding-wheel of the plow running in the furrow.

The accompanying drawings represent a seeding-machine embracing my improvements, which in its general form resembles the plow in common use.

The plow is provided with strong wide handles A, between which is pivoted a seeding-box, B, so that it is free to vibrate backward and forward. Extending from the beam C backward are two arms, D D'. To the rear end of these arms is attached a scoop, $a$, for the purpose of covering the drill. To one of these arms, D', a guide-wheel, E, is pivoted, which serves to direct and guide the plow in the furrow, and an open space is left between the other arm and the adjacent face of the guide-wheel for the seed to pass through. The periphery of this wheel is armed with radial points $b$, which strike against a projecting bar, $c$, extending from the bottom of the hopper, and carries the hopper forward and brings it in contact with a spring, $d$, attached to the plow-helve, which, after the passage of the point, causes the hopper to swing in the opposite direction, by which a positive movement is given to the seed-box, and the seed is agitated and loosened in the hopper. Passing through a slot between the bottom plates of the hopper is a serrated blade, F, the lower end of which is attached by a crank-pin, $e$, to the inner face of the guide-wheel, and through which it receives an upward-and-downward motion by the revolution of the wheel. The upper end of the blade is left free, so that it may move lengthwise in the hopper, in order to act upon the material contained in all parts of it. The serrations $g$ of the blade on one side incline upward and on the opposite side downward, in order to raise the material on the upward motion of the blade and agitate it more effectually and prevent its packing, and draw it out on its downward movement. The bottom of the hopper is formed with two plates, G, which slope toward the center, leaving a longitudinal opening in the bottom for the discharge of of the seed. The plates forming the bottom of the hopper are arranged so that they may be adjusted to increase or diminish, as may be desired, the size of the discharge-opening through which the serrated blade and seed pass, and they are also arranged so as to be inverted, the opposite edges being made with semicircular holes $h$ through each plate to allow larger grain—as corn—to pass. The serrated blade vibrates through the longitudinal slot between the edges of the plate, raises and agitates the seed, draws it out, and prevents it, whether by itself or mingled with fertilizer, from packing in the hopper or clogging the discharge-opening.

Having thus described my improvement in seed-planters, what I claim therein as new, and desire to secure by Letters Patent, is—

1. The combination of the hopper with a serrated blade receiving a positive movement in two directions for the purpose of agitating the seed and drawing it from the hopper, substantially in the manner described.

2. Leaving the upper end of the blade within the hopper unconfined, for the purpose set forth.

3. The combination of the serrated blade with a guide-wheel, when arranged so as to give a reciprocating movement to the blade, as herein described.

In testimony whereof I have subscribed my name.

THOMAS W. WHITE.

Witnesses:
F. SOUTHGATE SMITH,
THOMAS C. DONN.